(12) United States Patent
Molde et al.

(10) Patent No.: US 12,198,285 B2
(45) Date of Patent: Jan. 14, 2025

(54) SYSTEM AND METHOD FOR VIRTUAL GARMENT FITTING

(71) Applicant: Starius Technologies Corp., Arcola (CA)

(72) Inventors: Brett Molde, Arcola (CA); Preston Brigden, Arcola (CA); Kory Clearwater, Arcola (CA)

(73) Assignee: Starius Technologies Corp., Arcola (CA)

( * ) Notice: Subject to any disclaimer, the term of this patent is extended or adjusted under 35 U.S.C. 154(b) by 208 days.

(21) Appl. No.: 18/081,892

(22) Filed: Dec. 15, 2022

(65) Prior Publication Data

US 2023/0186582 A1 Jun. 15, 2023

(30) Foreign Application Priority Data

Dec. 15, 2021 (CA) ................................ CA 3142372

(51) Int. Cl.
*G06T 19/20* (2011.01)
*G06Q 30/0601* (2023.01)
*G06T 17/00* (2006.01)

(52) U.S. Cl.
CPC ......... *G06T 19/20* (2013.01); *G06Q 30/0643* (2013.01); *G06T 17/00* (2013.01); *G06T 2210/16* (2013.01); *G06T 2219/2012* (2013.01); *G06T 2219/2016* (2013.01)

(58) Field of Classification Search
CPC ..... G06T 19/20; G06T 17/00; G06T 2210/16; G06T 2219/2012; G06T 2219/2016; G06T 2219/2021; G06T 2219/2024; G06T 19/00; G06Q 30/0643
See application file for complete search history.

(56) References Cited

U.S. PATENT DOCUMENTS

| | | | |
|---|---|---|---|
| 10,460,525 B1 * | 10/2019 | Buuck | G01F 17/00 |
| 2017/0039775 A1 * | 2/2017 | Applegate | G06T 7/30 |
| 2021/0254308 A1 * | 8/2021 | Thibblin | E02F 9/2087 |

FOREIGN PATENT DOCUMENTS

WO WO-2020009066 A1 * 1/2020

OTHER PUBLICATIONS

Nakazato, machine translated English version, WO 2020009066 A1. (Year: 2020).*

* cited by examiner

*Primary Examiner* — Kee M Tung
*Assistant Examiner* — Biao Chen
(74) *Attorney, Agent, or Firm* — Christopher A. Proskey; BrownWinick Law Firm

(57) ABSTRACT

A virtual garment fitting method uses a database comprising avatar models of bodies of wearers which models are generated from multiple three-dimensional lidar scans and photographs of the wearer. The system graphically renders overlaid clothing overlays onto the avatar models—the clothing overlays are generated based on standardized images and sizing data stored within a database. The creation of the avatar models results in the ability to have the wearer actually experience in their virtual fitting as close as possible to a real scenario of fitting seeing their actual body shape and their face or limbs etc on the model.

8 Claims, 7 Drawing Sheets

SYSTEM AND METHOD FOR VIRTUAL GARMENT FITTING

This application is in the field of ecommerce methods for sales of clothing items and more specifically relates to a system for the virtual fitting of clothing articles onto a simulated body model of a purchaser.

BACKGROUND

Online clothing sales have proliferated as e-commerce methods have expanded in all retail spaces and channels. Many different online shopping cart and sales systems have been developed for the offer for sale of clothing items to the public. One of the primary issues with customer service and satisfaction in this industry and with online retail sales of clothing are clothing being returned to because it doesn't fit. Attempts at making this work better are it is believed to be well received in the clothing retail industry.

Many vendors use different types of "virtual fitting room" software, allowing the clothing purchaser to view and assess clothing articles virtually on a simulated body avatar of themselves. Many of the early stages attempts at virtual fitting rooms simply allowed purchasers to select a body type from a group of graphic body types presented to provide at least an artificial model of a body to show clothing articles on before purchase—and at the extreme opposite end of the complexity spectrum, some systems rely upon full three-dimensional body scans of the purchaser being conducted with advanced and expensive scanning equipment. It would be preferable to be able to provide a virtual fitting system which relied upon existing garment sizing infrastructure, and would remove the need for the use of expensive third-party scanning equipment in rendering accurate body model.

Once an accurate body model of the wearer is created, various types of scaling of images of clothing articles onto that model could be achieved, for the purpose of providing the most accurate graphic "virtual fitting room experience". It is believed that this virtual fitting room approach would be widely and easily marketable.

SUMMARY

One of the objects of one or more embodiments is to provide a virtual garment fitting method for displaying images of simulated graphical models of clothing articles on the body of a wearer using virtual body models/avatars the body of the wearer, to allow shoppers to virtually try on clothing articles in a virtual fitting room and online shopping experience.

A further object of one or more embodiments is to provide a virtual garment fitting method for displaying images of clothing article superimposed on the body of virtual body models/avatars of shoppers, which uses basic or pre-existing equipment and methods to capture the necessary data to render the body models required.

The method relies upon a server. The server typically comprises a processor and memory, and a network interface for communication with user client devices each having a user interface. The user client devices will typically be internet-connected smart devices or remote computers of potential clothing vendors and purchasers. Details of the server hardware will be understood to those skilled in the art and are all contemplated within the scope of one or more embodiments, as are the various types of user client devices.

In one or more embodiments, the server hosts a fitting software component for executing the steps of the method. The fitting software component will comprise any combination of locally stored or locally accessible processor instructions for execution on the server in conjunction with its hardware components and in communication with networked client devices to aid the execution of the virtual fitting method as further outlined herein.

In addition to the fitting software component, the server will also host or have access to a wearer database containing wearer records each corresponding to a clothing wearer. Each wearer record will store the necessary information of a clothing shopper/wearer to assist in the use of the present method—many different database structures will be understood to those skilled in the art along with many different types of wearer data which could be stored in a wearer record. Each wearer record will store at least the identification of the wearer, and a wearer avatar model being a mathematical model permitting the graphic rendering of a dimensionally accurate three-dimensional wearer avatar on the video display of a user device. The wearer avatar model is generated based upon multiple lidar scans and photographic images of the body of the wearer. Since the mathematical model stored in respect of the wearer avatar model will allow for dimensionally accurate rendered and interpretation of the size and shape of the body of the wearer, the wearer record will not store any wearer size values corresponding to clothing sizes. It will be intended that the remainder of the software of the method of one or more embodiments can accurately choose and select for display on the rendered avatar of the wearer a particular appropriate article of clothing in the selected appropriate clothing size based upon the dimensional elements of the wearer avatar stored in the model.

In addition to the wearer database, the server would also host or have access to a clothing database containing a plurality of clothing records each corresponding to a clothing article available-for-sale in at least one manufactured size. Each clothing record will contain the necessary data with respect to a particular size of a particular clothing article, permitting the rendering of the particular article and size combination onto the avatar of a wearer. The clothing record would at least contain in respect of the clothing article identifying details of the clothing article which might be used in a virtual fitting room or ecommerce system—product name, color choices, etc. in addition to the identifying information, the clothing record would comprise a plurality of static images of the clothing article, along with a mention information of the clothing article shown in the plurality of static images which permit the dynamic resizing and rendering of a resized model of the clothing article corresponding to different available-for-sale clothing article sizes. The dimension information would be sufficient to allow for the modification and rendering of size appropriate images of the clothing article in a particular available-for-sale size, for combination with the wearer avatar of the wearer. The clothing records could contain additional information as well as will be understood to those skilled in the art without departing from the intended scope of the present application.

The method comprises using the server and the fitting software component to execute certain steps as required. For example, a person wishing to use the system as a wearer could, using a client device in communication with the server, initiate a wearer creation request. On receipt of a wearer creation request, the fitting software component would execute a wearer record creation subroutine to create a wearer record.

Similar to the creation of wearer records, a clothing vendor or manufacturer could initiate a request to the server for creation of a clothing record in accordance with one or more embodiments—on receipt of a clothing creation request from a user client device, the server and software component could execute a clothing record creation subroutine to create a clothing record corresponding to a particular physical garment in at least one available-for-sale size, for use in the remainder of the fitting method in the clothing database.

The fitting software component can then execute virtual fitting requests based on wearer and clothing records stored. On receipt of a virtual fitting request from a client device in respect of and containing details corresponding to a wearer and a clothing article to be fitted the fitting software component could execute a fitting rendering step by first selecting a corresponding wearer record from the wearer database, being the selected wearer record, and selecting a clothing record from the clothing database corresponding to the clothing article to be fitted. The fitting software component could determine the best of the available-for-sale size as indicated in the clothing record to be tried on the wearer avatar, based in the least upon the body dimensions of the wearer stored in the corresponding wearer record and/or potentially also based upon other aspects of the mathematical model of the wearer avatar model. The user initiating the fitting request might also be permitted to manually select the desired available-for-sale size of the clothing article that they wish to try on, rather than a software-based recommendation. Both such approaches to identifying the correct available-for-sale size of the selected clothing article to be virtually fitted are contemplated within the scope of one or more contemplated embodiments.

Following the selection of a selected clothing record and the determination of the available-for-sale size to be fitted, being the desired size of the clothing article, the fitting software component will generate an appropriately sized clothing overlay, being a three-dimensional model of the clothing article in the desired article size which can be superimposed on a rendered version of the wearer avatar of the selected wearer record. The clothing overlay of the selected clothing article would be generated using the plurality of static images of the clothing article and the dimension information of the clothing article corresponding to the available-for-sale size in question. The clothing overlay would be dynamically generated such that if the system were to automatically or based upon user input select a different available-for-sale size to be shown on the avatar model of the wearer, a new clothing overlay would be generated to demonstrate the clothing article in the switched available-for-sale size.

A three-dimensional fitting image combining the wearer avatar model and the generated clothing overlay would then be generated and displayed on the video display of a user device of the wearer, for a simulated view capable of manipulation of the clothing article on the body of the wearer.

The clothing overlay would be dynamically generated each time a different available-for-sale size was selected by the user to try on the avatar of the wearer. By only storing a single set of static visual information related to the clothing article along with necessary dimension and sizing information related to the available-for-sale sizes of the clothing article in the corresponding clothing record, the complexity of the creation and maintenance of the clothing records is minimized.

As will be understood by those skilled in the art of database design and software design, many different wearer record creation subroutine workflows could be created within the scope and intention of one or more contemplated embodiments. For example, in some embodiments, the first step of the wearer record creation subroutine would comprise a data capture step consisting of serving a data capture interface to the user client device originating the wearer creation request permitting the entry of wearer details. The wearer details which would be captured by such an interface would include the identification of the wearer, along with multiple lidar scans and photographic images of the body of the wearer. Many user client devices now include lidar sensors and cameras such that the client software used in accordance with the remainder of the method of the present disclosure could facilitate the contemporaneous capture and storage of same, or could permit the uploading of saved scans and images. It is specifically contemplated that in one or more embodiments the system would not require the wearer, or the creator of a wearer record, to actually manually or physically capture any measurements of the body of the wearer subject of the wearer record but rather the lidar sensor scans and related images would supply sufficient automatically captured information to permit the fitting software component to render a reasonably dimensionally accurate and visibly accurate image of the body of the wearer in question.

The server would then receive the completed and transmitted wearer details from the user client device and using the lidar scans and photographic images contained therein would generate a wearer avatar model. The wearer avatar model is a mathematical model by which a three-dimensional rendering of the body of the wearer could be created for subsequent use and user interaction in the remainder of the method. Various types of mathematical modelling approaches could be used for this purpose. Following the generation of the wearer avatar model, the server and software component could then create and store a corresponding wearer record in the wearer database. It is explicitly contemplated that the user client device used by an individual creating a wearer record could include a camera and lidar sensor and the data capture interface served in the data capture step permits the use of the camera and lidar sensor for live capture of the necessary multiple lidar scans and images of the body of the wearer.

Just as there can be many different approaches taken to the overarching workflow of a wearer record creation subroutine in accordance with the remainder of the method of the present disclosure, there are also many types of clothing record creation subroutine workflows which can be contemplated within the scope of one or more contemplated embodiments which would result in the capture of the necessary information to create a complete and relevant clothing record pertaining to a particular clothing article in the clothing database. In a first embodiment of the clothing record creation subroutine, the first step would be a data capture step which again similar to that outlined with respect to the wearer record creation subroutine data capture step outlined above would consist of the service of a data capture interface to the user client device originating the clothing record creation request, permitting the entry of clothing details for capture to the server. The clothing details which would be captured would comprise at least identifying details of the clothing article, as well as a plurality of static images of the clothing article. It would also include dimension information of the clothing article in the plurality of static images, permitting dynamic resizing of rendering of a graphic clothing overlay of the clothing article corresponding to different available-for-sale sizes of the clothing article. The server would receive the completed and transmitted clothing details from the user client device and create or update a corresponding clothing record in the clothing database.

In one or more embodiments, the system and software could provide a software interface by which manufacturers or retailers seeking to use the system and method of the present disclosure for virtual fitting and retail purposes could rapidly create clothing records for use in accordance with the remainder of the system and method—for example using user client devices that include a camera which allowed the live capture of the plurality of static images of the clothing article. The fitting software component will have the necessary mathematical modelling components associated therewith not only for the purpose of accurately creating a three-dimensional mathematical wearer avatar model of the wearer for the purpose of subsequently rendering an image of the shape of the body of the wearer in a three-dimensional format for application of clothing article overlays thereto, based upon multiple lidar scans and photographic images of the body of the wearer, as well as for the rendering of clothing overlays, being the necessary data to dynamically render overlay images of clothing articles stored in clothing records and subsequently render and apply a dimensionally accurate graphic overlay of a particular size of a particular clothing article to a wearer avatar for the purpose of visual display via the video interface of the user device. Any type of a mathematical modelling software capable of rendering these mathematical models for the purpose of the subsequent rendering of graphic or visual displays of particular wearer-based wearer avatars with graphic overlays of particular clothing articles in particular sizes applied thereto will be understood to be within the scope of one or more contemplated embodiments.

In one or more embodiments, the system and method of the present disclosure could be offered on a service bureau basis whereby the server and software thereof could be connected via an API or otherwise into third-party shopping cart or e-commerce website platforms for the purpose of virtual fitting of clothing articles, or in other approaches, the system and method of the present disclosure could be deployed on a single vendor basis within a particular single vendor website environment. Both such approaches will be understood to those skilled in the art and the necessary modifications etc. are all contemplated within the scope of one or more contemplated embodiments to achieve such approach.

In a virtual fitting, based upon a virtual fitting request received from a client device, the server would permit the selection of a corresponding wearer record from the wearer database which is the selected wearer record. That could be facilitated by login credentials which equated to a particular wearer record, or the user can input particular search criteria to select the appropriate wearer record. Any type of an approach resulting in the selection of the appropriate wearer record corresponding to the user will be understood to be within the scope of one or more contemplated embodiments. Following the selection of a particular wearer record, the system will also facilitate the selection of a clothing article to be fitted through a data interface permitting the user to indicate a selected clothing record corresponding to the desired clothing article.

The software component will then, based upon the selected wearer record and the selected clothing record, conduct additional steps to facilitate the virtual fitting. The software component will first select the most likely to fit available-for-sale size of the corresponding clothing article from the available-for-sale sizes of the corresponding clothing article outlined in the selected clothing record, and based upon the body size of the individual outlined in the selected wearer record.

The software component would next generate an appropriately sized clothing overlay for the desired size selected in relation to the selected clothing record, using the plurality of static images and dimension information of the clothing article in the size in question stored in the clothing record. The clothing overlays a three-dimensional model of the clothing article in the desired article size which can be superimposed as a "skin" on a rendered version of the wearer avatar of the selected wearer record.

The fitting software component would generate a three-dimensional fitting image being a combined three dimensional image combining the wearer avatar model of the selected wearer record and the generated clothing overlay, which will effectively show in a reasonably dimensionally accurate way the imposition of the desired size of the clothing article in question onto the body model of the wearer corresponding to the selected wearer record. The rendered fitting image will then be displayed on the video display of the corresponding user client device, providing a manipulable three-dimensional view of the selected clothing article in the desired size superimposed on the body of the wearer.

The clothing overlay generated during the execution of the virtual fitting request will be dynamically generated in so far as the clothing overlay will be generated in respect of each virtual fitting request and each desired size selection.

In one or more embodiments, the software of the present disclosure for integration with e-commerce platforms of various types, along with the method of virtual garment fitting outlined herein, and a server hosting the databases and software component outlined for the purpose of achieving one or more the objectives of the contemplated embodiments are all intended to be within the scope of this provisional disclosure and capable of claiming at a later date.

DESCRIPTION OF THE DRAWINGS

To easily identify the discussion of any particular element or act, the most significant digit or digits in a reference number refer to the figure number in which that element is first introduced. The drawings enclosed are.

DETAILED DESCRIPTION OF ILLUSTRATED EMBODIMENTS

As outlined herein, one or more embodiments comprise a virtual garment fitting method for displaying images of simulated graphical models of clothing articles on the body of a wearer using scale-standardized models of the clothing articles and the body of the wearer, using pre-existing garment sizing scales and equipment to generate the graphical models of the clothing articles for use.

System and Architecture Overview

Figure 1:
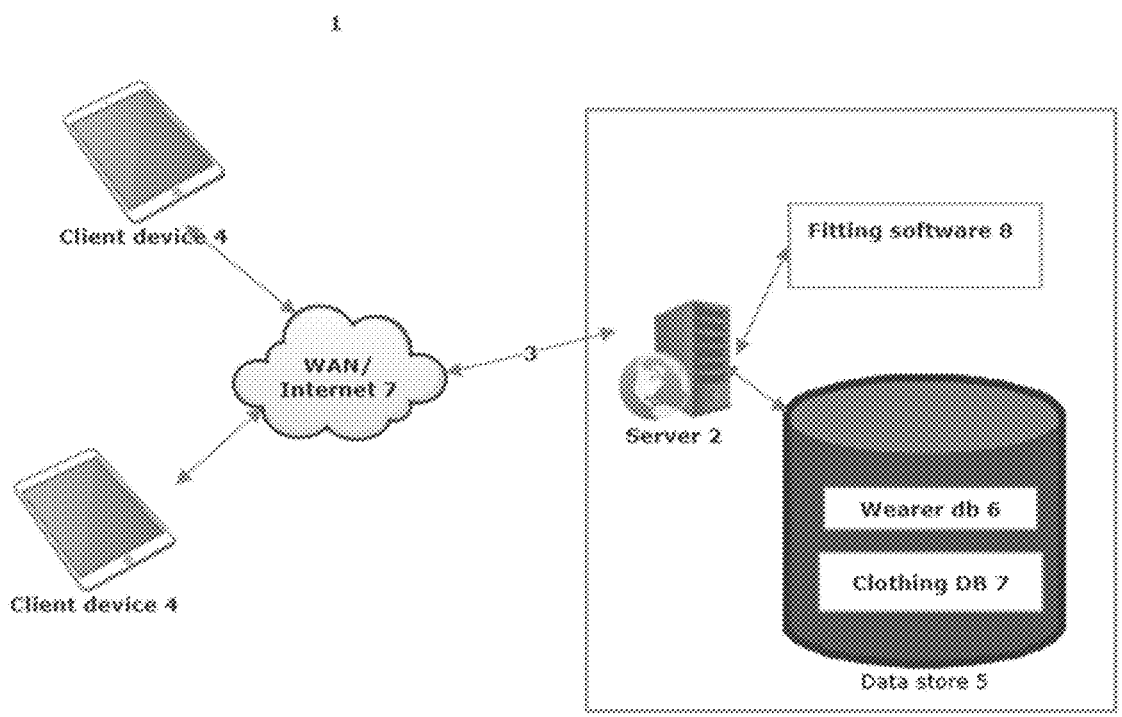
FIG. 1 is a schematic diagram of one embodiment of the system of one or more contemplated embodiments including client devices for demonstrative purposes.

For the purpose of describing the method of one or more embodiments of the present disclosure we will now describe briefly the overall architecture of the system 1 of the present disclosure as required for the purpose of describing one or more embodiments. Referring to FIG. 1 there is shown a schematic diagram of the system 1 of the one or more embodiments. The system 1 comprises a server 2 having a network interface 3 capable of communication with user client devices 4. The user client devices 4 are shown connected to the server 2 via the Internet 9. The user client device 4 terminology is used to refer to client devices 4 connectable to the server 2 both for use by wearers as well as vendors in accordance with the remainder of the system and method of one or more embodiments. It is assumed that in many cases the server 2 would communicate with the client devices 4 through a browser interface or something similar, which would make it very easy for a consolidated communications client to be used in any kind of a client device 4—any type of an approach which results in either a browser interface or locally installed client software on a client device 4 or use either by a vendor or a wearer in accordance with the remainder of one or more embodiments will be understood to be within the scope hereof.

The server 2 would also include or be operatively connected to a data store 5, capable of hosting or containing a plurality of databases for the practice of the method of one or more embodiments. Shown are the wearer database 6 and a clothing database 7. Details of an example of a data structure for these databases are shown in subsequent Figures.

In addition to the necessary other software and hardware components of any type of server 2, the server 2 also includes as an additional component particularly required for the practice of the method of one or more embodiments a fitting software component 8, operable on the server and capable of executing the steps of the method.

Figure 2:
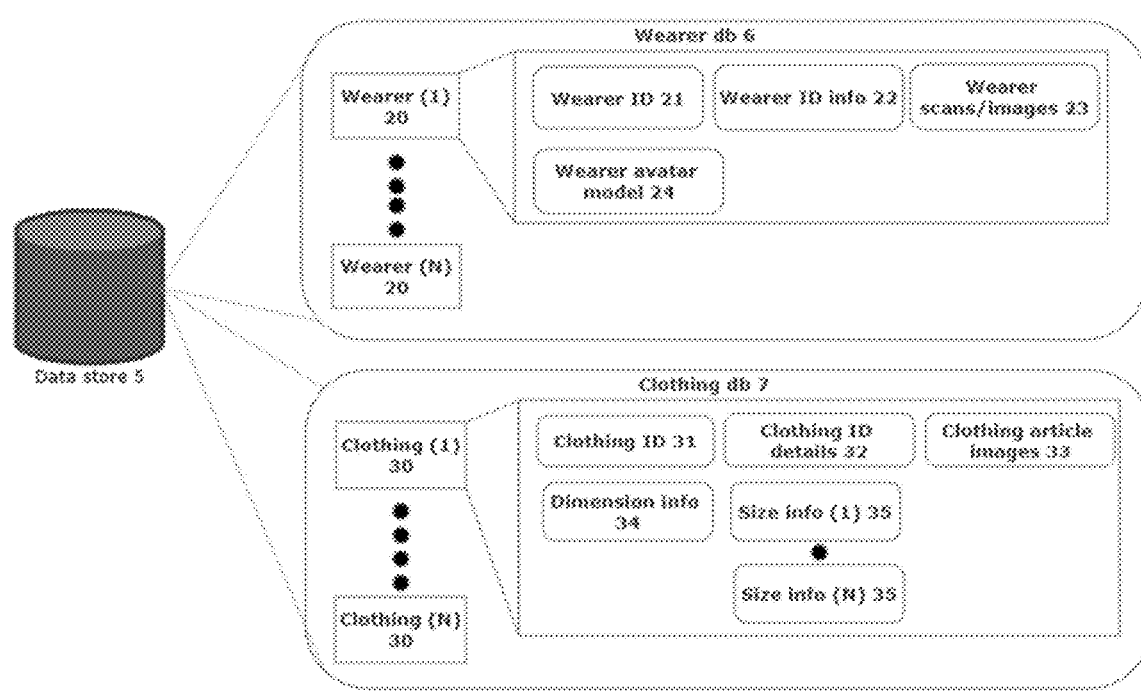
FIG. 2 is a block diagram demonstrating one embodiment of basic data structures of the databases of the system of FIG. 1.

Referring to FIG. 2 there is shown a demonstrative data structure for the data store 5 and the wearer database 6, clothing database 7. Each of these databases 6, 7 are shown in this Figure. As will be obvious to those skilled in the art other types of data structures could also be used in which each of the databases 6, 7 could be data residing within a single database structure. Either a single consolidated dataset for individual or silo databases will be understood to be within the intended scope of one or more contemplated embodiments.

Figure 3:
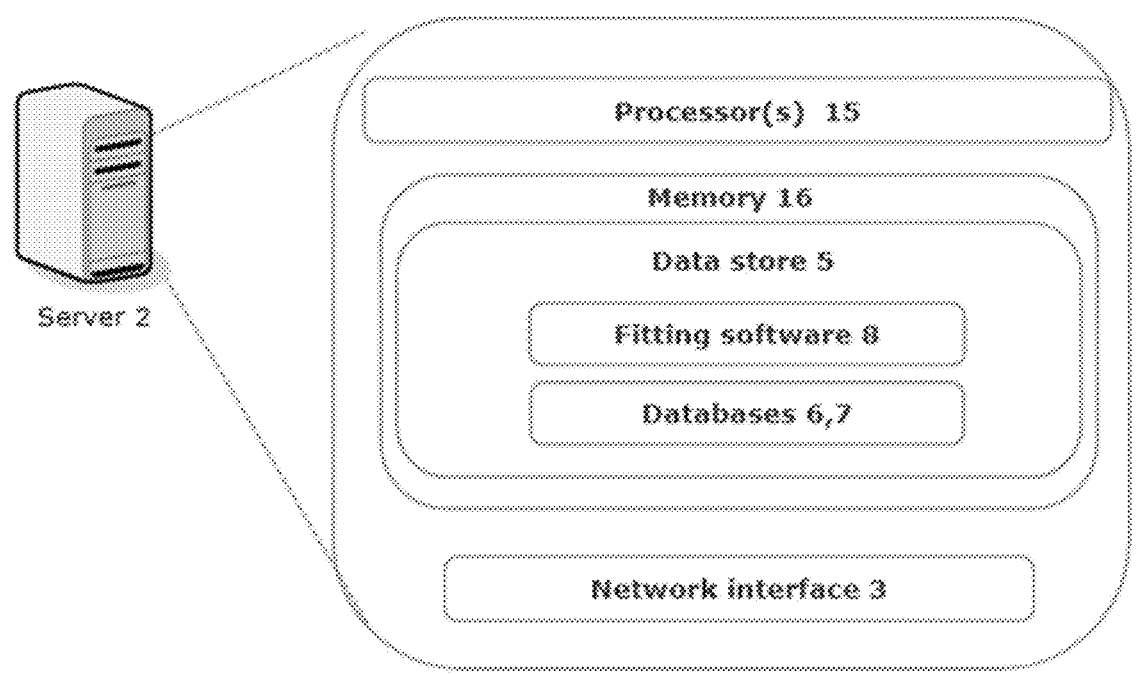
FIG. 3 is a block diagram demonstrating the key components of one embodiment of the server in accordance with one or more contemplated embodiments.

FIG. 3 shows one embodiment of a server 2 in accordance with one or more embodiments. The method of one or more embodiments and the overall architecture would be client/server in nature and would rely on a server 2 configured for use in the processing of virtual fitting data transactions in accordance with the method. The server 2, a sample embodiment of which is shown in FIG. 3, might consist of one or more servers 2—a single server or a server farm approach. The server 2 would comprise one or more processors 15 and memory 16. The memory 16 might contain various software components or a series of processor instructions for use in the method of one or more embodiments or otherwise in the operation of the server 2. Processor instructions corresponding to the fitting software component are shown stored within the memory 16 in this Figure.

Memory 16 may comprise non-transitory storage media that electronically stores information. The electronic storage media of memory 16 may include one or both of system storage that is provided integrally (i.e., substantially non-removable) with server(s) 1 and/or removable storage that is removably connectable to server(s) 1 via, for example, a port (e.g., a USB port, a firewire port, etc.) or a drive (e.g., a disc drive, etc.). Memory 16 may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 16 may include one or more virtual storage resources (e.g., cloud storage, a virtual private network, and/or other virtual storage resources). Memory 16 may store software algorithms, information determined by processor(s) 15, information received from server(s) 2, information received from client devices, and/or other information that enables server(s) 2 to function as described herein.

Processor(s) 15 may be configured to provide information processing capabilities in server(s) 2. As such, processor(s) 15 may include one or more of a digital processor, an analogue processor, a digital circuit designed to process information, an analogue circuit designed to process information, a state machine, and/or other mechanisms for electronically processing information. In some implementations, processor(s) 15 may include a plurality of processing units. These processing units may be physically located within the same device, or processor(s) 15 may represent processing functionality of a plurality of devices operating in coordination.

In many embodiments, the server 2 is contemplated to be a Web server, where client devices would use a web browser for interaction therewith. Where a local app was developed, server 2 might not be a Web server per se but might be a server 2 capable of interaction with that type of an interface on remote client devices. Either such approach is contemplated within the scope hereof.

Server 2 would also include at least one network interface 3 via which it could communicate with the at least one communications network for the purpose of enabling communication with the user client devices of the remainder of the method as outlined herein. It will be understood by those skilled in the art of network design and hardware and software design that certain server architectures might include more than one network interface 3 and any type of a server 2 and network interface 3 design which enabled the communication of the server 2 as outlined in the remainder of the method would all be contemplated within the scope of one or more contemplated embodiments.

Fitting Software Component

In one or more embodiments, the server hosts a fitting software component for executing the steps of the method. The fitting software component will comprise any combination of locally stored or locally accessible processor instructions for execution on the server in conjunction with its hardware components and in communication with networked client devices to aid the execution of the virtual fitting method as further outlined herein.

The fitting software component 8 resident on or accessible to the server 2 would be key to the performance of the present method. Functions of the fitting software component 8 would include the creation, administration, and maintenance of database records within the databases 6, 7 along with interacting with client devices as required for the purpose of facilitating the method. The fitting software component 8 could also encompass any additional required querying, reporting or added software functionality.

The fitting software component 8 will comprise any compiled processor instructions capable of being executed by the processor of the server 2. It will be understood that any fitting software component 8 having the effect of being able to administer the method of the present disclosure as outlined is contemplated within the scope of one or more contemplated embodiments.

The fitting software component will have the necessary mathematical modelling components associated therewith not only for the purpose of accurately rendering a three-dimensional mathematical human avatar model of the wearer for the purpose of subsequently re-rendering the shape of the body of the wearer in a three-dimensional format for application of clothing articles thereto, as well as for the rendering of graphic clothing overlays, being the necessary data to subsequently render and apply a particular size of a particular clothing article to the human avatar of the wearer for the purpose of visual consideration by the video interface of the user device of the application of that particular article to the body of the wearer and assessment of its desirability for purchase. Any type of a mathematical modelling software capable of rendering these mathematical models for the purpose of the subsequent rendering of graphic or visual displays of particular wearer-based human avatar is with particular clothing articles in particular sizes applied thereto will be understood to be within the scope of one or more contemplated embodiments.

The fitting software component 8 might comprise a core software engine with additional mathematical modules attached for the purpose of rendering the various mathematical models of the graphics in question. The mathematical and graphic rendering components insofar as they are interoperable or connected with the primary fitting software component would for the purpose of this disclosure comprise a part of the fitting software component and overall and in aggregate comprise a portion of the contemplated fitting software component 8 and its functionality.

Data Store

The wearer database 6 consists of a plurality (N) of wearer records 20, corresponding to each wearer using the system and method of one or more contemplated embodiments. Each wearer record 20 includes the necessary fields or data to practice the method—in basic embodiments, the wearer record 20 would include a serial key or wearer identifier 21, any wearer identifying information 22, wearer size value 23 corresponding to the standard scale clothing size of the wearer, and the wearer avatar model 24 comprising the necessary derived or rendered mathematical information which is required to subsequently generate a three-dimensional view of the body of the particular wearer for application of clothing overlays thereto.

As outlined throughout, the wearer avatar model 24 is created based upon a plurality of lidar scans and still images of the body of the wearer in question. The details of the underlying lidar scans and still images might be also stored in the wearer record 20, shown at 23. Storing this underlying information is not mandatory, since the wearer avatar model 24 could be rendered based upon the lidar scans and images and then those details could be purged from the memory of the server or the computer rendering the model 24. Both such approaches are contemplated within the scope of the contemplated embodiments. It will be understood to those skilled in the art of database design and the design and execution of various fitting room systems and methods such as that outlined herein that additional functionality could be added to the system and method of one or more embodiments that might require the storage of additional wearer related information in the wearer database 6, and the data structure of each wearer record 20 could be modified accordingly and is contemplated with any such modification to remain within the scope one or more embodiments as described and claimed herein.

The clothing database 7 consists of a plurality (N) of clothing records 30, each of which corresponds to a clothing article offered for sale by a vendor in at least one available-for-sale size. Each clothing record 30 includes the necessary fields or data to permit the ultimate application of an overlay of the clothing article in a selected available-for-sale size to a wearer avatar representing the wearer avatar model 24 of a particular wearer record 20. In the embodiment shown, the clothing record 30 includes a serial key or clothing identifier 31. Additionally, the clothing record 30 as indicated will contain any necessary article identifying details 32 which might include sales options or information like colors, available patterns, or other text information to be displayed to a customer.

The record 30 will also include at least one static image 33 of the clothing article. Also included are the necessary dimensional information 34 of the clothing article in general and as shown in the article image 33, such that the fitting software component 8 can render dimensionally adjusted graphic overlays of the clothing article for superimposition onto the wearer avatar of a wearer. In addition to the dimensional information 34, the record could include other necessary details in respect of each available-for-sale size 35 of the clothing article in question. Each clothing record 30 would include a graphic image 33 and the necessary dimensional information 34 to render dimensionally correct graphic clothing overlays of the clothing article in question for superimposition onto the wearer avatar of the wearer. The dimensional information 34 and the details 35 of the available-for-sale sizes of the clothing articles, along with the wearer information 22 etc. stored along with the wearer avatar model 2480 each wearer record 20 will be stored in a way that both the graphic clothing overlays and the wearer avatars can be rendered in the same scale at the time that the clothing overlay as superimposed onto the wearer avatar.

It is specifically contemplated that the system and method of one or more contemplated embodiments would be facilitated by the provision of client software for use on user client devices 4 in conjunction with the server 2. The client software application could be programmed to operate in conjunction with the camera of a user client device 4 to permit the capture of site captured images and lidar scans of the body of the wearer for use in the creation of wearer records in the database.

Method Overview

Figure 4:
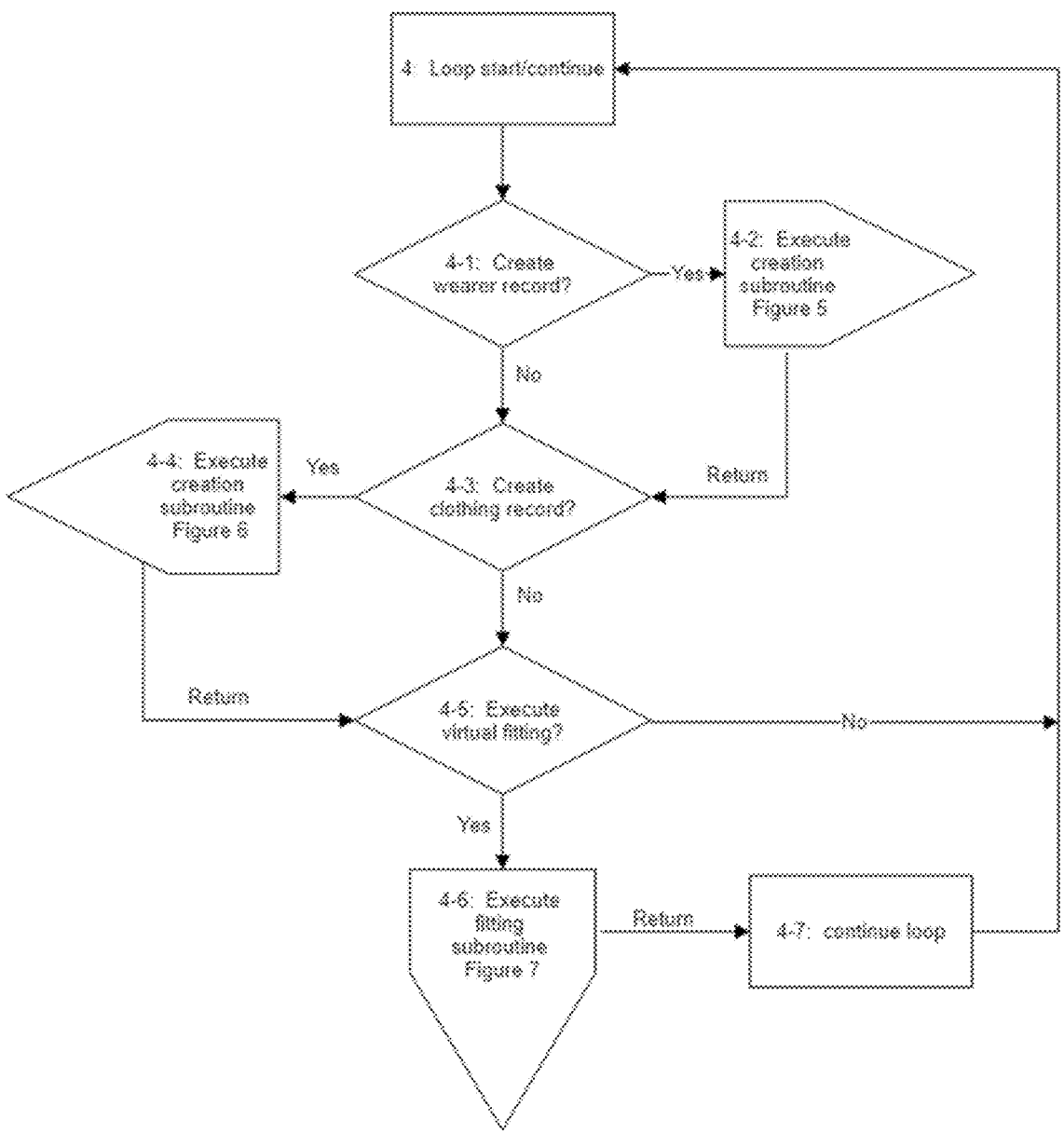
FIG. 4 comprises a flowchart demonstrating the steps of a first embodiment of the method of one or more contemplated embodiments.

FIG. 4 is a flowchart demonstrating the steps of a first impelementation of the method of the present disclosure, in which users can create the necessary data records for the execution of virtual fittings in accordance with one or more embodiments, as well as execute virtual fittings of clothing articles with a human avatar of the user for graphic display in accordance with the method. The method, as executed by the fitting software component 8 in accordance with the remainder of the system 1 of FIGS. 1 to 3, would as demonstrated be conducted in a perpetual loop fashion, although it will be understood to those skilled in the art of software design that there are many different orderings or approaches to the steps in the method as outlined which would still achieve the same objective and would not depart from the intended scope claimed herein.

The method comprises using the server 2 and the fitting software component 8 to execute certain steps as required. The method shown in this Figure is a listener/repeat loop. A listener would determine if there was a requirement to create a wearer record for a new wearer in the system. If a user interaction from a user client device is detected requiring the creation of a wearer record 20, a wearer record creation subroutine is executed before returning to the primary repeat loop. Detection of the condition requiring creation of a wearer record is shown at step 4-1, and the off page execution of the creation subroutine of FIG. 5 is shown at step 4-2.

Figure 5:
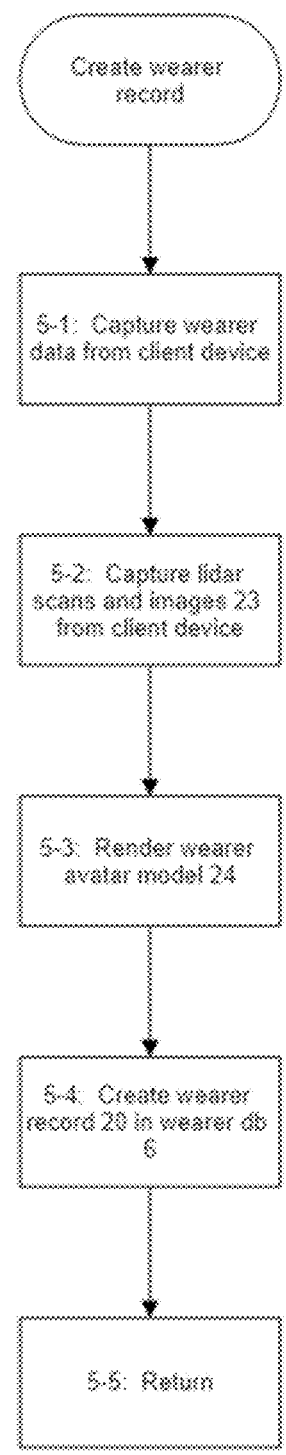
FIG. 5 is a flowchart showing the steps in one embodiment of a wearer record creation subroutine for association with FIG. 4.

If it is desired to create a wearer record 20 and the subroutine of FIG. 5 is activated, the server 2 in communication with a user client device 4 would capture data including wearer identifying information 22, along with images and lidar scans 24 of the body of the wearer. Capture of this information via a user interface interaction between the server 2 and the wearer client device 4 is shown at 5-1 and 5-2. It is explicitly contemplated that the user client device 2 used by an individual creating a wearer record 20 could include a camera and lidar sensor to capture the necessary images and lidar scans of the body of the wearer for upload to the server in the creation of the remainder of the wearer record 20 particulars.

Following the receipt of the captured wearer information at the server 2, the fitting software component 8 would generate the wearer avatar model 24, which comprises the necessary derived or rendered mathematical information or graphical data which is required to subsequently generate a three-dimensional graphical view of the body of the particular wearer for application of clothing overlays thereto. Various types of mathematical and graphical modelling approaches could be used for this purpose. The lidar scans in particular would permit the interpretation and rendering of a dimensionally accurate mathematical model of the body of the wearer, and the images could also be used for example to include information in the wearer avatar model 24 permitting application of appropriate skin tone, hair color etc. Following the generation of the wearer avatar model 24, the server 2 and software component 8 could then create and store a corresponding wearer record in the wearer database.

The wearer record 20 might also include a stored copies 23 of the images and lidar scans used in the rendering of the wearer avatar model 24. Generation of the wearer avatar model 24 shown at step 5-3.

Following the generation of the wearer avatar model 24 a corresponding wearer record 20 would be created in the wearer database 6, shown at 5-4, and the subroutine would return control to the primary loop shown in FIG. 4. As will be understood by those skilled in the art of database design and software design, many different wearer record creation subroutine workflows could be created within the scope and intention of one or more contemplated embodiments.

Returning to FIG. 4, shown next at 4-3 is another listener seeking indication of the requirement for the creation of a clothing record 30 in the clothing database 7. Upon initiation of a communication session or interaction for the creation of a clothing record 30, or receipt of indication from a client device indicating a desire to create a clothing record, a clothing record creation subroutine is executed before returning to the primary repeat or monitoring loop. Detection of the condition requiring the creation of a clothing record is shown at step 4-3, and the triggering of the off page execution of the creation subroutine of FIG. 6 is shown at step 4-4.

On receipt of a clothing record creation request from a user client device, the server 2 and software component 8 could execute a clothing record creation subroutine to create a clothing record corresponding to a particular size of a particular physical garment for use in the remainder of the fitting method in the clothing database.

Figure 6:
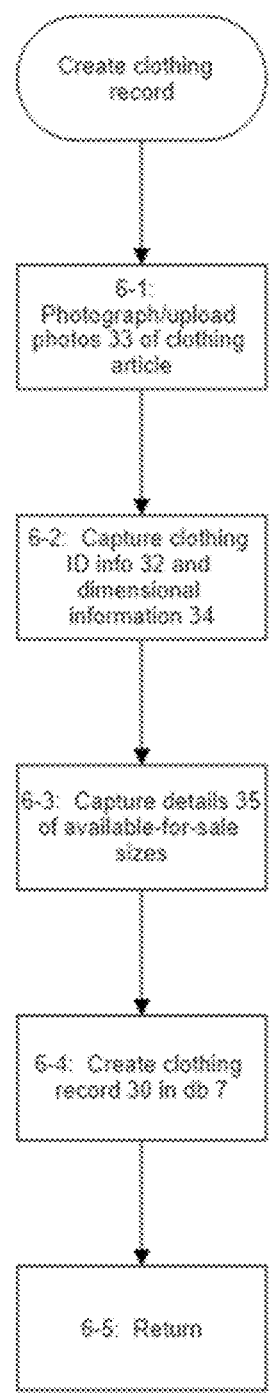
FIG. 6 is a flowchart showing the steps in one embodiment of a clothing record creation subroutine for association with FIG. 4.

In the creation of a clothing record 30 as outlined in the clothing record creation subroutine of FIG. 6, a user client device 4 could interact and transmit clothing data to the server 2. The client device 4 might have a camera for capture of photographs of the clothing article being profiled, or might upload photographs that were previously or otherwise captured. A plurality of images 33 of the clothing article would be captured for subsequent storage to the clothing record 30 to be created. Capture or upload of the images 33 is shown at step 6-1.

Clothing data as would be captured for storage to a clothing record 30 could include identifying information 32 which could be used in a sale display etc. The capture of clothing data 32 from the client device, including identification details or sale details to be used in the rendering of e-commerce interfaces for the clothing article, and the necessary dimensional information to be used in subsequent dynamic rendering of dimensionally accurate graphic goal clothing overlays related to the clothing article in a particular available-for-sale size, is shown at step 6-2. The user interface might also permit the user and the client device 4 to upload additional sizing information 34 with respect to each available for sale size of the clothing article in question (Step 6-3).

Following the capture of all the necessary information from the client device 4, the software 8 can create the clothing record 30 in the clothing database 7, as shown at step 6-5. Control would then be returned to the main method and routine of FIG. 4 as the embodiment demonstrates.

The next step in the overall monitoring loop of FIG. 4 as shown is a listener on the server 2 capable of detecting the receipt of a virtual fitting request initiated by a client device 4. In such a case, the virtual fitting subroutine of FIG. 7 will be actuated, shown at 4-6.

Figure 7:
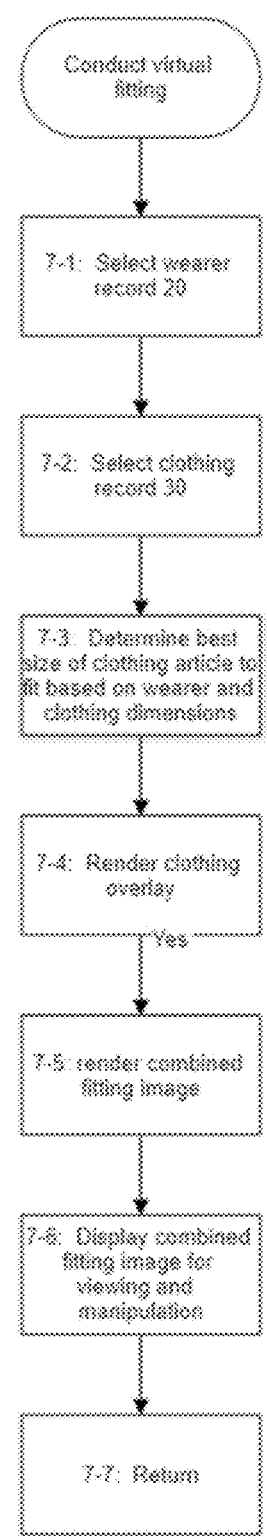
FIG. 7 is a flowchart showing the steps in one embodiment of a virtual fitting transaction for association with FIG. 4.

Referring to FIG. 7 the fitting software component 8 can then execute virtual fitting request based on wearer and clothing records stored. On receipt of a virtual fitting request from a client device 4 in respect of and containing details corresponding to a wearer and a clothing article to be fitted the fitting software component 8 could execute a fitting rendering step by first selecting a corresponding wearer record 20 from the wearer database 5, being the selected wearer record, and selecting a clothing record from the clothing database corresponding to the clothing article to be fitted. The selected wearer record in the selected clothing record could be selected by the user interface by a user of the client device 4. Selection and acquisition of the details of the selected wearer record 20 and selected clothing record 30 are shown in steps 7-1 and 7-2.

The next step of the subroutine shown in FIG. 7 is the determination by the fitting software component 8 of the best available-for-sale size of the clothing article outlined in the selected clothing record 30 to be tried on the body of the wearer represented in the selected wearer record 20, based upon the body dimensions of the wearer which can be captured or identified from the wearer record 20 and the wearer avatar model 24 in particular, as well as the stored dimensional information related to various available-for-sale sizes of the clothing articles stored in relation to the selected clothing record 30. This selection step is shown at step 7-3.

Following the selection of the desired size of the clothing article to be fitted, the fitting software component 8 would render a clothing overlay of the clothing article in the selected clothing record 30. The clothing overlay would be rendered based upon the graphic information stored in the images 33 stored within the clothing record 30 along with the sizing dimensional information 30 or and any other information related to the particular available-for-sale size which has been selected as the desired size. This dynamic rendering of the graphic clothing overlay is shown at step 7-4. The graphic clothing overlay could be generated by multiple mathematical approaches all of which are contemplated within the scope of one or more contemplated embodiments insofar as they all result in the creation of the necessary data and process your instructions which can subsequently be used by the server or another computer processor to render a graphic graphic clothing overlay applied to a human avatar model in accordance with the remainder of the one or more embodiments. For example, the graphic clothing overlay might accommodate stretching or other appearance alterations of the rendered clothing article dependent upon the shape and size of the human avatar applied thereunder i.e., so that the wearer using the virtual fitting method can see if a particular clothing article will fit tightly, loosely, or correctly and how it will stretch or apply over particularly shaped or sized body parts.

The fitting software component 8 would then render a combined fitting image by applying the graphic clothing overlay to the wearer avatar model 24 stored in relation to the selected wearer record 20. Rendering of the combined fitting image is shown at step 7-5. In step 7-6, the rendered combined fitting image would be displayed on the client device 4 for viewing and/or manipulation. If the wearer or user wanted to try a different size of the clothing article on they could manually select a different available-for-sale size related to the clothing record 30 in question and the graphic clothing overlay and combined fitting image could be re-rendered and displayed in the new size combination. The combined fitting image is a graphic model combining the wearer avatar model of the selected wearer record with the graphic clothing overlay of the selected clothing record—effectively superimposing the image of the particular size of the corresponding clothing article onto the avatar of the wearer.

In one or more embodiments, the system permitting for virtual fitting could be integrated into a freestanding e-commerce system, providing the ability for purchasers to virtually try on the garments of one or more sizes to view them in advance of purchase and thus the integration could also facilitate a shopping cart function etc. where purchases could be facilitated through the vendor website. Alternatively, the system and method of one or more contemplated embodiments could also be modified to include the necessary shopping cart functionality to internally facilitate product sales. Both such approaches are contemplated within the scope of the one or more contemplated embodiments.

Software Modeling Components

As outlined, the fitting software component 8 will include numerous elements which will have the purpose of rendering mathematical or graphical models of the body of clothing wearers, of clothing articles, or also of the rendering of a combined graphical display model of a particular clothing article superimposed on the body of a particular wearer by rendering a combined model and image of a particular wearer avatar model and a selected graphic clothing overlay. It may be possible or desirable in certain iterations of the system and method of one or more contemplated embodiments for the fitting software component 8 to include integration or incorporation of third-party software components to be used for these mathematical modeling functions, and it will be understood that the fitting software component 8 might comprise locally installed or remotely connected software components of third parties to deliver the combined required functionality outlined herein and all such approaches are also contemplated within the scope of one or more contemplated embodiments.

It will be understood that in one or more embodiments, the system and method could be extended or used to provide fitting abilities by displaying wearer body and clothing overlay combinations to a user. For example a user interface to the remainder of wearer and clothing databases could be created which would permit a particular wearer to automatically view the superimposition of clothing overlays of only particular clothing articles in the right size to fit their body based upon the information stored in the corresponding wearer record, or in other iterations, the e-commerce system would allow the wearer upon authentication with the database system of one or more contemplated embodiments either directly or through an API connection to a third party e-commerce site.

The core of the system and method of one or more contemplated embodiments is the actual creation of the necessary data records and models to permit the virtual fitting method to be practiced regardless of the specific e-commerce integration or ultimate customer delivery method. It will be understood that any type of an e-commerce site incorporating either as a direct connected and integrated component, or by a third party or API or the like, the system and necessary software outlined herein for the purpose of practicing the enhanced garment fitting method one or more embodiments are all contemplated within the scope hereof.

It will be apparent to those of skill in the art that by routine modification various embodiments may be optimized for use in a wide range of conditions and application. It will also be obvious to those of skill in the art that there are various ways and designs with which to produce the apparatus and methods of the contemplated embodiments. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprise" and "comprising" should be interpreted as referring to elements, components, or steps in a non-exclusive manner, indicating that the referenced elements, components, or steps may be present, or utilized, or combined with other elements, components, or steps not expressly referenced.

The invention claimed is:

1. A virtual garment fitting method for displaying images of clothing articles on the body of a wearer, using a server comprising:
   a. a processor and memory;
   b. a network interface for communication with user client devices each having a user interface;
   c. a fitting software component for executing the steps of the method;
   d. a wearer database containing wearer records each corresponding to a respective wearer of a plurality of wearers and comprising at least:
      i. an identification of the respective wearer; and
      ii. a wearer avatar model being a mathematical model permitting graphic rendering of a dimensionally-accurate three-dimensional wearer avatar model on a video display of a user client device, said wearer avatar model being generated based upon multiple lidar scans and photographic images of the body of the respective wearer; and
   e. a clothing database containing a plurality of clothing records each corresponding to a respective clothing article, each clothing record comprising at least the following:
      i. identifying details of the respective clothing article;
      ii. a plurality of static images of the respective clothing article; and
      iii. dimension information of the respective clothing article in the plurality of static images, permitting dynamic resizing and rendering of a resized model of the respective clothing article corresponding to different clothing article sizes in which the respective clothing article is available for sale;
said method comprising, using the server and the fitting software component:
   a. on receipt of a wearer creation request from the user client device, executing a wearer record creation subroutine to create a wearer record corresponding to a wearer desirous of using the fitting method in the wearer database;
   b. on receipt of a clothing creation request from the user client device, executing a clothing record creation subroutine to create a new clothing record corresponding to a respective clothing article for use in the remainder of the fitting method in the clothing database;
   c. on receipt of a virtual fitting request from the user client device in respect of and containing details corresponding to a wearer and a selected clothing article to be fitted, executing a fitting rendering step by:
      i. selecting a corresponding wearer record from the wearer database, being the selected wearer record;
      ii. selecting a corresponding clothing record from the clothing database corresponding to the selected clothing article to be fitted based upon clothing article identifying information received with the virtual fitting request, being the selected clothing record;
      iii. generating an appropriately sized three-dimensional model of the selected clothing article subject of the selected clothing record in an appropriate size to fit the wearer avatar model of the selected wearer record, based on the plurality of static images and other information stored in the selected clothing record;
      iv. rendering a three-dimensional fitting image combining the wearer avatar model and the generated three-dimensional model of selected the clothing article; and
      v. displaying the rendered fitting image on the video display of the user client device for a manipulable three-dimensional view of the selected clothing article on the body of the wearer;
   wherein the appropriately sized three-dimensional model of the selected clothing article generated in the processing of the virtual fitting request is dynamically generated in response to the virtual fitting request.

2. The method of claim 1 wherein the wearer record creation subroutine comprises:
   a. in a data capture step, serving a data capture interface to the user client device originating the wearer creation request permitting the entry of wearer details comprising:
      i. the identification of the wearer; and
      ii. multiple lidar scans and photographic images of the body of the wearer;
   b. receiving completed and transmitted wearer details from the user client device at the server;
   c. using the multiple lidar scans and photographic images of the body of the wearer, generating the wearer avatar model being a mathematical model by which a three-dimensional rendering of the body of the wearer can be created; and
   d. creating and storing the wearer record in the wearer database corresponding to the captured wearer details and the generated wearer avatar model.

3. The method of claim 2 wherein the user client device is a mobile device including a camera and a lidar sensor.

4. The method of claim 1 wherein at least one of plurality of clothing records comprises details from which accurate color, pattern and other details can be achieved in the rendering of a fitting image.

5. The method of claim 1 wherein the clothing record creation subroutine comprises:
   a. in a data capture step, serving a data capture interface to the user client device originating the clothing creation request permitting the entry of clothing details comprising:
      i. identifying details of the respective clothing article;
      ii. a plurality of static images of the respective clothing article; and
      iii. sizing and dimension information of the respective clothing article in the plurality of static images, permitting dynamic resizing and rendering of a resized model of the clothing article in different sizes and dimensions;
   b. receiving completed and transmitted clothing details from the user client device at the server; and
   c. creating and storing the new clothing record in the wearer database corresponding to the captured clothing details.

6. A virtual garment fitting method for displaying images of clothing articles on the body of a wearer, the method comprising:
  a. on receipt of a wearer creation request from a user client device, executing a wearer record creation subroutine to create a wearer record corresponding to a wearer desirous of using the fitting method in a wearer database;
  b. on receipt of a clothing creation request from the user client device, executing a clothing record creation subroutine to create a clothing record corresponding to a clothing article for use in the remainder of the fitting method in a clothing database;
  c. on receipt of a virtual fitting request from the user client device in respect of and containing details corresponding to the wearer and a selected clothing article to be fitted, executing a fitting rendering step by:
    i. selecting a corresponding wearer record from the wearer database, being the selected wearer record;
    ii. selecting a corresponding clothing record from the clothing database corresponding to the selected clothing article to be fitted based upon clothing article identifying information received with the virtual fitting request, being the selected clothing record;
    iii. generating an appropriately sized three-dimensional model of the clothing article subject of the selected clothing record in an appropriate size to fit a wearer avatar model of the selected wearer record, based on a plurality of static images and other information stored in the selected clothing record;
    iv. rendering a three-dimensional fitting image combining the three-dimensional model of the wearer avatar model and the generated three-dimensional model of the selected clothing article; and
    v. displaying the rendered fitting image on a video display of the user client device for a manipulable three-dimensional view of the selected clothing article on the body of the wearer;
  wherein the appropriately sized three-dimensional model of the selected clothing article generated in the processing of the virtual fitting request is dynamically generated in response to the virtual fitting request.

7. The method of claim 6, wherein the wearer database contains wearer records each corresponding to a respective wearer and comprising at least:
  a. an identification of the respective wearer; and
  b. a wearer avatar model being a mathematical model permitting the graphic rendering of a dimensionally-accurate three-dimensional wearer avatar model on the video display of the user client device, said wearer avatar model being generated based upon multiple lidar scans and photographic images of the body of the respective wearer.

8. The method of claim 6, wherein the clothing database contains a plurality of clothing records each corresponding to a respective clothing article, each clothing record comprising at least the following:
  a. identifying details of the respective clothing article;
  b. the plurality of static images of the respective clothing article; and
  c. dimension information of the respective clothing article in the plurality of static images, permitting dynamic resizing and rendering of a resized model of the respective clothing article corresponding to different clothing article sizes in which the clothing article is available for sale.

* * * * *